(12) United States Patent
Turner et al.

(10) Patent No.: US 6,505,229 B1
(45) Date of Patent: Jan. 7, 2003

(54) METHOD FOR ALLOWING MULTIPLE PROCESSING THREADS AND TASKS TO EXECUTE ON ONE OR MORE PROCESSOR UNITS FOR EMBEDDED REAL-TIME PROCESSOR SYSTEMS

(75) Inventors: Larry A. Turner, McKinney, TX (US); Edwin A. Osberg, Plano, TX (US); James Kevin McCoy, Garland, TX (US)

(73) Assignee: Intelect Communications, Inc., Richardson, TX (US)

( * ) Notice: Subject to any disclaimer, the term of this patent is extended or adjusted under 35 U.S.C. 154(b) by 0 days.

(21) Appl. No.: 09/160,955

(22) Filed: Sep. 25, 1998

(51) Int. Cl.[7] ................................................. G06F 9/00
(52) U.S. Cl. ........................ 709/107; 709/102; 709/100
(58) Field of Search ................................. 709/100, 101, 709/102, 103, 104, 105; 717/127, 116, 118, 128; 711/6

(56) References Cited

U.S. PATENT DOCUMENTS

| 4,432,051 A | * | 2/1984 | Bogaert et al. | ............. 717/127 |
| 5,884,077 A | * | 3/1999 | Suzuki | ........................ 709/105 |

* cited by examiner

*Primary Examiner*—Majid A. Banankhah
(74) *Attorney, Agent, or Firm*—Robert H. Frantz (57) ABSTRACT

This invention relates to embedded processing systems used for industrial, commercial, and medical automated systems in which microprocessors or digital signal processors are employed to perform a plurality of distinct tasks based on real-time events and conditions. In particular, this invention provides an efficient processing system and environment in which a variety of application threads may share the processing bandwidth and system resources cooperatively and efficiently, with minimized coupling of the application threads to each other and system resource control details.

5 Claims, 7 Drawing Sheets

METHOD FOR ALLOWING MULTIPLE PROCESSING THREADS AND TASKS TO EXECUTE ON ONE OR MORE PROCESSOR UNITS FOR EMBEDDED REAL-TIME PROCESSOR SYSTEMS

TECHNICAL FIELD OF THE INVENTION

This invention relates to processing systems and apparatus and the organization and control of their functions, with particular usefulness to Digital Signal Processing ("DSP") systems. More specifically, the present invention provides an efficient operating system for a single processor or for multiple processor system, that does not abstract or hide processor hardware functionality from the application programmer while enabling quick high-level application development. The inventive operating system allows the application programmer to make maximum use of the specific processor system hardware features in order to achieve maximum functional density of the functions of the processing or DSP system.

BACKGROUND OF THE INVENTION

Single-chip microprocessors have been in existence for over 20 years. Digital Signal Processors ("DSP"), which were first introduced over 15 years ago, are specialized forms of microprocessors, for which the instruction set and processor architecture has been optimized for functions such as control loops, infinite impulse response ("IIR") and finite impulse response ("FIR") filters, Kalman filtering, image processing, and signal recognition.

Embedded operating systems ("OS") for microprocessors and DSP's have been available almost as long as the devices themselves. This was a natural evolutionary step to allow quicker development of applications on embedded microprocessors and DSPs, following the evolution of mainframe computers and their operating systems. However, because of the different application environment of microprocessors and DSPs from mainframes, the microprocessor embedded OS's primary objective is to allow ease of application development while maximizing embedded system resources.

Some prior art embedded OS's are designed to allow easy and efficient porting of application programs from one microprocessor or DSP to another microprocessor or DSP. In such embedded operating systems, the details of the processing resources of the system are abstracted from the application program, and a uniform application programming interface ("API") is presented by the OS to the application program. This allows the application program to interact with system resources in the same manner independent of the actual hardware processing system on which it is running.

Additionally, most of these prior art embedded operating systems take a modular approach to their functions, supplying input/output ("I/O") routines for applications to communicate with other applications and with hardware internal and external to the processor. Most of the operating systems also provide some type of real-time control and scheduling mechanism to allow the activation of certain software functions in response to events such as a hardware interrupt, timer expiration, or receipt of a communication message.

Further, embedded operating systems specific to DSPs typically include functions for memory management specific to signal processing types of algorithms, such as circular and linear queue pointer management. Some embedded DSP operating systems include a library of actual DSP algorithms, such as programmable filters, but these libraries are not classically part of the operating system, but rather are portions of application program.

However, these generalized API approaches of the prior art usually have resulted in inefficient use of particular architectural advantages of a given microprocessor or DSP because these capabilities are abstracted from the API. This results in reduced functionality of an application on a particular DSP or microprocessor. For example, if the application is simultaneous multiple-channel voice recognition, an application written using a generalized DSP operating system cannot achieve the same number of channels of functionality than the same application running with a custom kernel for the DSP.

This is a well known fact within the art, and is a point of engineering tradeoff commonly considered and analyzed during the early phases of design of a system with a DSP. On one hand, using the generalized DSP operating system allows for quicker code development and product upgrade to future DSPs. On the other hand, a custom kernel allows the same product to be implemented with a less expensive processor or fewer processors.

Some of the prior art embedded operating systems have implemented scalable architectures to allow applications designers to omit unused components of the operating system. This is an attempt to make the DSP OS more efficient, both in terms of memory utilization and bandwidth consumption.

Therefore, there exists a need in the art for an operating system that allows effective utilization of processor-specific features. Further, this operating system should provide a high-level API for applications development, while it simultaneously and efficiently uses and allocates the available hardware resources to multiple separate and distinct processes within an application.

Further, there exists a need in the art to allow flexible communications between separate and distinct processes within an application and between applications and hardware resources.

There exists a further need in the art for an embedded operating system to automatically release system resources that were initially allocated to a process which has been terminated, in order to maintain efficient use and re-use of system resources.

Finally, there exists a need in the art for all of the aforementioned features and functionality to allow separate and distinct processes within applications on separate and distinct processors to interact and inter-operate seamlessly.

SUMMARY OF THE INVENTION

The object of the present invention is to provide a processing system which allows flexible programming and execution environment for a wide range of applications while also providing efficient use of specific processor hardware and architecture features.

A further object of the present invention is to provide flexible interprocess communications mechanisms enabling multiple processes within a single processor or among a plurality of processors to communicate with one another. These flexible interprocess communications mechanisms provide an abstraction between input or sources of data, and output or consumers of the data. This abstraction allows a designer to implement a data producer process with little or no knowledge of the possible consumer processes with respect to their numbers or location. It also allows a designer to implement a data consumer process with little or no knowledge of the producer process.

A further objective of the present invention is to provide an efficient mechanism that automatically releases the system resources that were allotted to terminated processes, and returns those resources to the pool of available resources for other processes. These system resources may include system memory, data communications mechanisms, control mechanisms such as semphores and locks, system timers, other various peripherals, and interrupt assignments.

BRIEF DESCRIPTION OF THE DRAWINGS

To better understand the present invention, the following description references the accompanying drawings, in which.

DETAILED DESCRIPTION OF THE INVENTION

In the inventive embedded multi-tasking processing system, application programming is simplified by the availability of the operating system's thread management, control, resource management, and communication mechanisms without sacrificing efficient use of system processing resources, thereby enabling straightforward implementation of system functionality coincident with high-density of functionality.

The philosophy behind the inventive processing system is based upon several tenants, which principally are determinism, efficiency, completeness and simplicity. In accordance with this philosophy, the processing system's embedded operating system ("OS") is organized into four functional groups: the System Resource Management Group ("SRM"), the Device Management Group ("DMG"), the Thread Synchronization Group ("TSync"), and the Thread Communication Group ("TCom").

System Resource Management Group constituents provide the essential core functionality of the operating system. The SRM includes critical sections, an internal data heap, interrupt management, thread management (task swapping), and generic data types. The SRM provides division of the available processor bandwidth, whether for a single or multiple processor system, across all threads in the system. The internal data heap of the SRM supports dynamic memory allocation, as well as allocation and reclamation of processing system resources upon termination of threads. Interrupt management of the SRM provides interrupt configuration, dynamic vector installation and low-latency interrupt services.

Thread management in the SRM provides multi-threaded, deterministic, asynchronous and synchronous preemptive means of task or thread activation and deactivation. Thread-owned system resources are dynamically allocated and released in a deterministic and reentrant environment. Threads retain exclusive use of independent stack spaces and register contexts, and they may be operated upon in a variety of well-defined ways.

Generic data types within the SRM support system independence, and are employed throughout the OS.

The Device Management Group may include microprocessor internal and external hardware peripheral support for direct memory access ("DMA") controller(s), internal and external system memory configuration, a host interface port ("HPI"), processor serial ports and system timers. DMG constituents encapsulate internal peripherals, without sacrificing the flexibility to utilize the full extent of device-specific functionality. This is an important and significant distinction of the inventive processing system and the operating systems commonly known within the art, and this supports the objectives of the invention.

The Thread Synchronization Group constituents provide synchronization primitives such as semaphores and locks.

The Communications Resources Group includes crossbar communications channels. Crossbars are synchronized, switched data channels, with configurable input and output mappings.

The operating system of the inventive processing system is organized into modular interfaces. In the preferred embodiment, the OS functions adhere to a "C" calling convention. Most interfaces in the OS are reentrant and do not require application-level mutual exclusion mechanisms. Interrupts, which interact explicitly with any OS interface, must be defined in the Critical Section interface in order to ensure mutual exclusion.

Additionally in the preferred embodiment, the OS interfaces are both statically and dynamically configurable. Static configuration is achieved through conditional compilation, and may be used to customize the thread interface, and to omit non-essential interfaces from an application-specific build. Some interfaces are essential to system operation, and are automatically required for all application builds. Thus, essential components cannot be omitted through Static Configuration. Required interfaces include System Resource Management Group constituents and Device Management Group timer functions. Dynamic configuration is supported through the OS interfaces that perform dynamic resource allocation on demand. Further in the preferred embodiment, protection is afforded to all dynamically allocated resources. Generally, a dynamic resource may be released only by its creator, or a privileged thread. The OS supports dynamic resource reclamation, or "garbage collection", upon thread termination.

Figure 1:
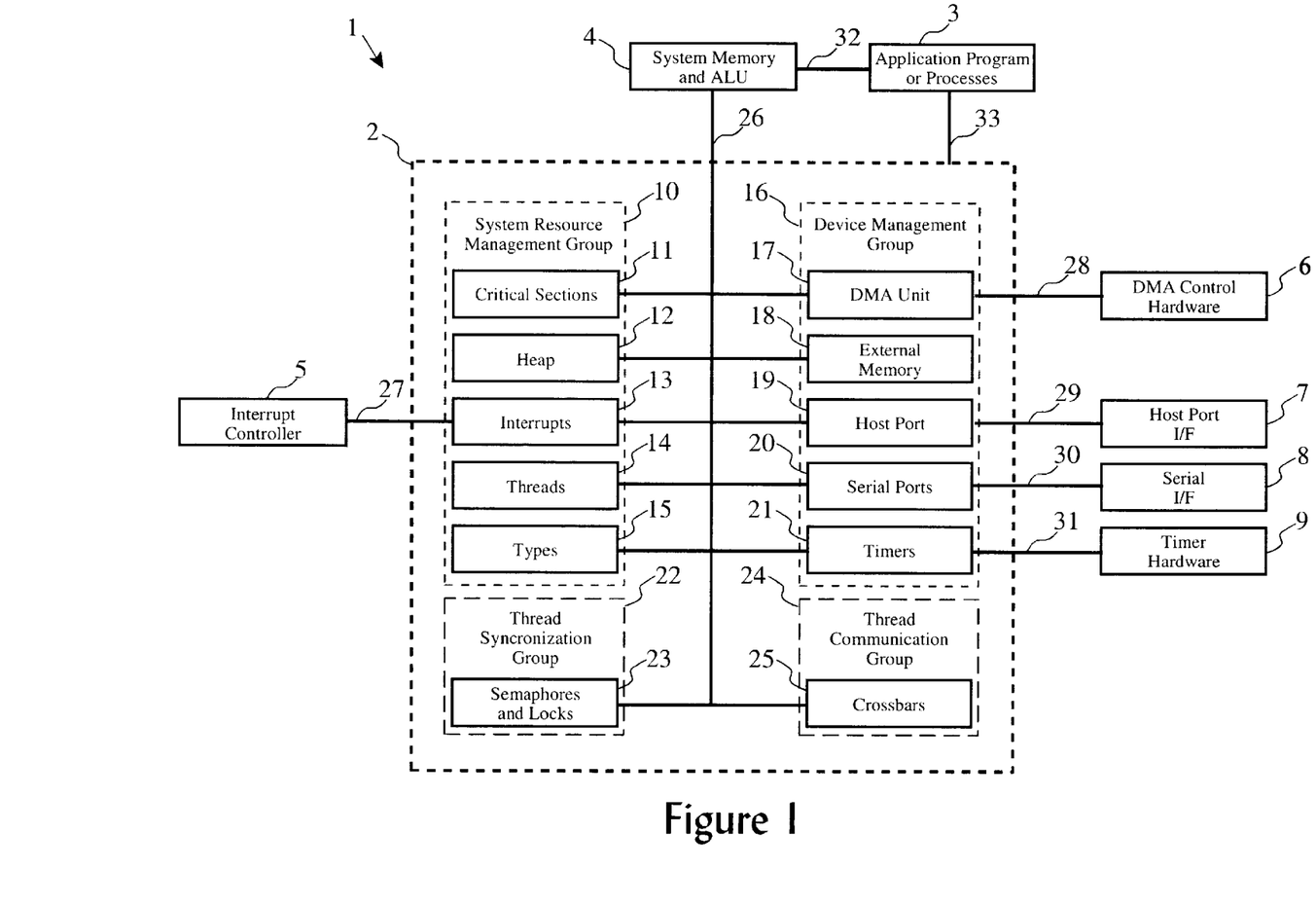
FIG. 1 shows the organization of the inventive multitasking processing system and architecture.

Turning to FIG. 1, the architecture and organization of the inventive processing system is illustrated. The processing system (1) is comprised of several hardware, firmware, and software components or groups of components, including the operating system (2), the system memory and arithmetic logic unit ("ALU") (4), the application program or processes (3), an interrupt controller (5), a direct memory access ("DMA") controller (6), a host port interface ("HPI") (7), a serial data interface (8), and timer hardware (9). These represent the system resources as implemented in the preferred embodiment using a Texas Instruments TMS320C6x Digital Signal Processor, but some components may not be present in all realizations of the inventive system, such as the HPI, when implemented using a different DSP or microprocessor. It should also be noted that system memory may include internal and external processor memory, and the ALU may be a floating point or integer ALU, depending on the processor incorporated into the system.

The OS (2) and application program (3) are executed by the processing system (1) through hardware interpretation of the OS (2) and application program (3) code. A system bus (26) allows the DSP to access the program and data related to the OS (2) and application program (3) to execute the code in manners well known in the art. Specific firmware and software control of the other DSP system hardware resources including the DMA controller (6), the HPI (7), the serial data interface (8), timers (9), and interrupt controller (5) is usually gained through sets of memory-mapped registers. These registers are shown as system elements 27, 28, 29, 30, and 31 in FIG. 1. This method of hardware resource control is well known in the art.

Finally, FIG. 1 shows the internal organization of the OS (2) as four groups, including the System Resource Management Group (10), the Device Management Group (16), the Thread Synchronization Group (22), and the Thread Communications Group (24). The System Resource Management Group (10) is comprised of Critical Sections (11), the Heap (12), Interrupt service code (13), Threads (14), and Data Types (15). The Device Management Group may include DMA control code (17), External memory configuration and mapping code (18), Host Port communications and control code (19), serial data port communications and control code (20), and timer control and maintenance code (21) (some components may not be present in some embodiments depending on the application of the embedded processing system). The Thread Synchronization Group (22) consists of semaphore and lock functions (23), and the Thread Communications Group includes the crossbar communications functions (25).

When the system is started or restarted, from a hardware or software reset condition or from a power up event, the processing system and it's associated application programs must be initialized. Methods of initialization of operating systems and application programs are well known within the art, and specific implementation of an initialization scheme is not key to the preferred embodiment of the inventive processing system. Following OS initialization, execution control of the processor is transferred to the application code at a predefined entry point (39) by the System Resource Management Group thread management function within the OS.

The OS then enables the processing system to execute multiple application-specific threads. No background or monitor threads exist in the inventive processing system. This is key to the efficiency of the processing system because background and monitor threads compete with application threads for processor execution bandwidth, thereby maximizing the amount of processor bandwidth available to the application threads.

Figure 2:
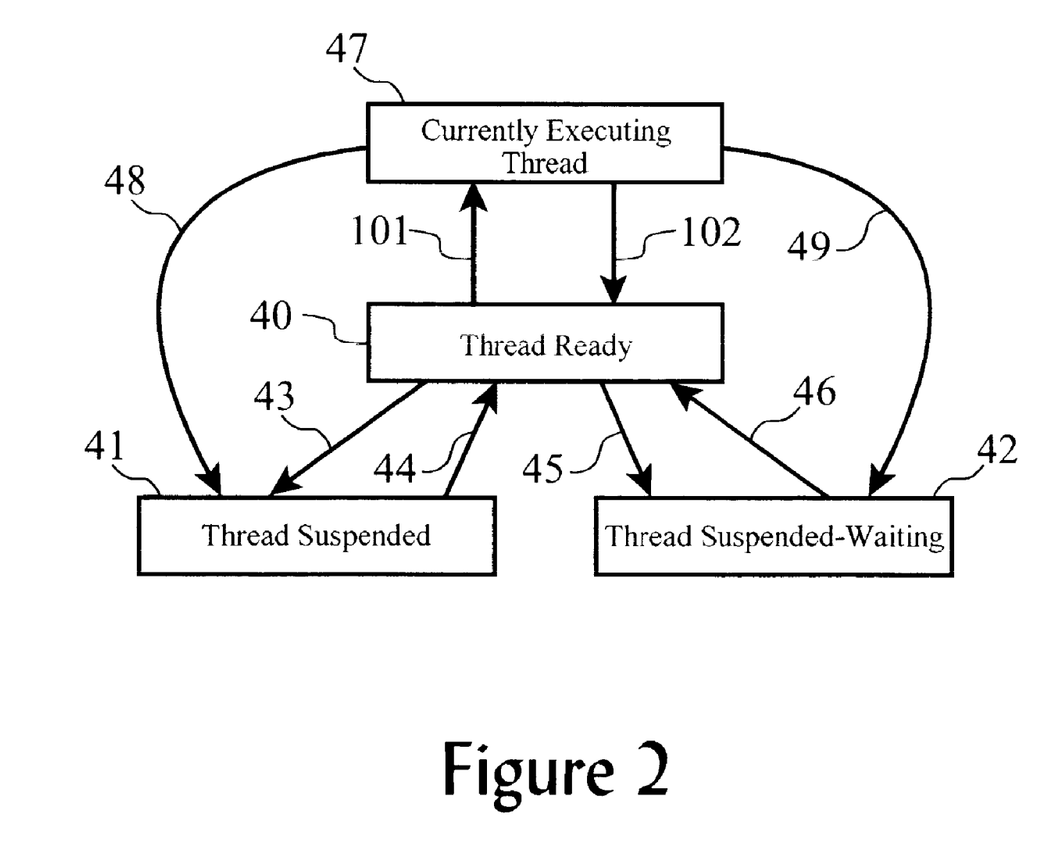
FIG. 2 illustrates the state transitions for a thread, which is key to the efficiency of the multitasking processing operating system and to understanding the multitasking capabilities of the system.

Turning now to FIG. 2, non-executing threads exist in one of three states: Ready (40), Suspended (41), and Suspended-Waiting (42). This minimized set of possible thread states further enables efficiency of the embedded processing system. Threads are initially created in the Ready state (40). In the preferred embodiment, Ready threads are linked members of a Ready list, and are queued and awaiting for some combination of synchronous and asynchronous preemption events to advance in the Ready list and run.

Currently executing threads may transition to a Ready state if their time slice is exceeded. Methods of determining time slice expiration are well known within the art. In the preferred embodiment, this is accomplished by a small, and efficient interrupt service routine ("ISR") assigned to a hardware timer interrupt. When the timer interrupt occurs that indicates a particular time slice has expired, the currently executing thread is interrupted, the ISR is executed, and an OS function call is made to change the currently executing thread to a Ready thread placed on the bottom of the Ready queue or list.

Currently executing threads may also suspend themselves through an OS function call, and may place themselves into a suspended-waiting state through an OS function call.

Threads in the Suspended state (41) are indefinitely suspended. Threads are explicitly changed from the Ready (40) state to the Suspended (41) state through the execution of a specific software function in the preferred embodiment. Also, according to the preferred embodiment, suspended threads must be explicitly resumed in order to transition to a Ready state through execution of another software function.

Threads in the Suspended-waiting state (42) are indefinitely suspended while awaiting a pre-defined collection of associated event signals. When the thread does not require control of the processor until such events occur, the thread executes a specific OS software function to transition to the Suspended-waiting (42) state in the preferred system and OS embodiment. Upon the occurrence of the anticipated events, the OS executes a function which transitions the suspended-waiting thread back to a Ready (40) state. Transitions to a Ready state for Suspended-waiting threads that become ready simultaneously are made in a first-in first-out ("FIFO") order.

One normally suspended idle thread exists. The idle thread consumes bandwidth only when no other threads in a ready state exist. Bandwidth consumed by the thread interface is exclusively on demand, excluding synchronous preemption.

Control of the processor execution can be transferred from one thread to another by synchronous or asynchronous preemption. This concept is common in the art. Synchronous preemption is based on an event, such as receipt of a hardware interrupt signal, or the expiration of a hardware timer.

Synchronous preemption consumes very few processor cycles in preferred embodiment, thus yielding more processor bandwidth to be available for the application threads. In the present embodiment utilizing a Texas Instruments TMS320C6x DSP, synchronous preemption is estimated to require only 54 cycles, excluding interrupt latency, for every context switch. Further, the timer-based synchronous preemption period may be configured at the time of compilation. A configurable timer channel, the associated interrupt enable and interrupt vector is reserved.

Asynchronous preemption may be the implicit or explicit result of a system call to an OS interface. Exercise of well-defined subsets of thread, semaphore and crossbar interfaces may cause asynchronous preemption or alter the state of a thread.

A further increase in efficiency of the inventive processing system is realized by eliminating the thread and task prioritization scheme used by many operating systems, and replacing it with a variable time-slicing scheme. Prioritization schemes also introduce an element of uncertainty and unpredictability of prior art processing systems, which further complicates the design of real time processing systems. By incorporating a variable time-slicing scheme into the inventive processing system, deterministic execution of the application software is gained and the amount of processor bandwidth consumed by the thread management functionality is considerably reduced.

The variable time-slice classification is determined upon thread creation, in units of time, and is fixed for the life of the thread. In the preferred embodiment, variable time-slicing is constrained by heredity and privilege for threads created by other threads. Threads that are in the Ready state, i.e. in the Ready queue, are allowed to execute in the first-come first-serve fashion. Threads which are in a suspended or suspended-waiting state, move to the bottom of the Ready queue at the end of their suspension state, and are allowed to execute in the same first-come first-serve manner as all other pending threads in the Ready queue.

Figure 3A:
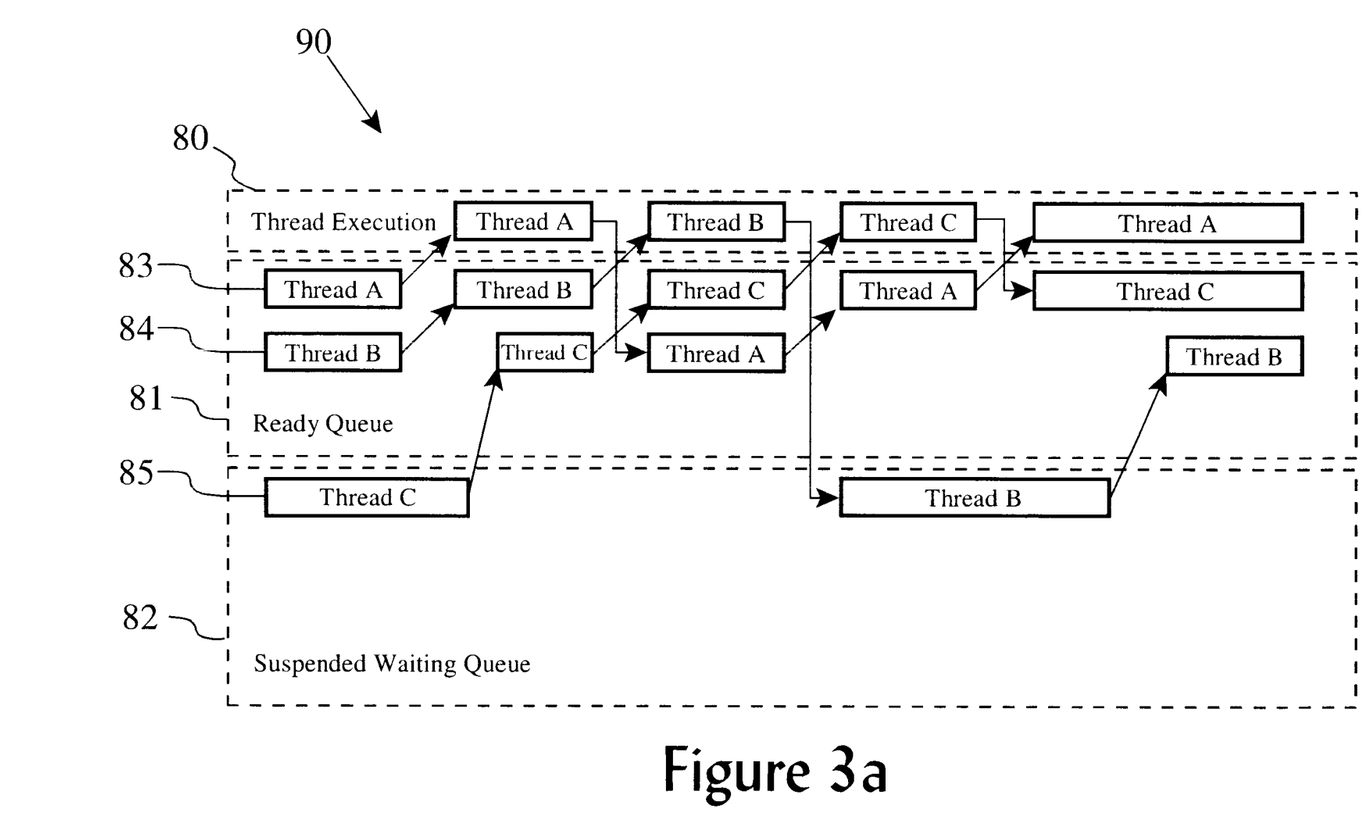
FIGS. 3a and 3b depict the time-slicing method used to allow multi-task processing in the processing system.

FIG. 3a graphically depicts a basic scenario of three active threads, thread A (83), thread B (84), and thread C (85), running on the inventive digital signal processing system OS (90). For reference to time progression, the time bar (86) in FIG. 3a indicates progression of time moving from left to right on FIG. 3a. As seen in FIG. 3a, threads A and B (83 and 84 respectively) are initially in the Ready queue (81) at $t_0$, with thread A (83) pending as the next thread to execute when the processor becomes available. Also, at to, thread C (85) is shown in a Suspended-waiting state, awaiting the occurrence of a specific event. At time=$t_1$ in FIG. 3a, the processor is available for a task swap, so thread A (83) is allowed to execute on the processor (80), and thread B (84) is advanced to the next pending position in the Ready queue (81). At time=$t_2$ in FIG. 3a, the event on which thread C (85) is waiting is shown occurring, and thread C is moved to the bottom of the Ready queue (81). Subsequently, thread A (83) executes until its pre-defined maximum execution time expires at time=$t_3$, and thread A (83) is moved to the bottom of the Ready queue (81). This allows thread B (84) to be executed on the processor (80), and thread C (84) advances to the next pending position in the Ready queue (81).

To further illustrate how threads can move to the suspended-waiting state from a state of being executed, FIG. 3a shows at time=$_4$, thread B (84) executes a suspend-wait OS command, and is subsequently changed to a suspended-waiting state. This allows thread C (85) to execute on the processor (80), and causes thread A (83) to become the next pending thread in the Ready queue (81). Thread C (85) is shown at time=$t_5$, to expire its maximum allowed execution time, so the operating system moves thread C to the bottom of the Ready queue and allows thread A (83) to execute on the processor (80). Finally in FIG. 3a, an event occurring at time=$t_6$, causes the operating system to change the state of thread B (85) from suspended-waiting to a Ready state, queued at the bottom of the Ready queue (81), just behind thread C (85) which is still in the Ready queue. This particular method of handling threads purely on a time-slice basis, with three states of existence when not executing and a FIFO next-thread Ready queue allows for very efficient task swapping, and it is a key element to achieving the advantages of the inventive digital signal processing system. Software and hardware design techniques necessary to implement this method are well known in the art, and can include high-level code such as "C", assembly level code, or hardware logic to make the decisions. In the preferred embodiment, this method is implemented using Texas Instruments TMS320C6x DSP assembly language to further increase the efficiency of its execution.

In the inventive processing system, threads may create other threads. The owner or parent thread can also destroy any thread that it created. The created threads, or "children threads", execute independently of the owner thread from an execution viewpoint, and are scheduled for processor execution time with equal priority of all other threads. The owner thread can assign a maximum time-slice to its children threads equal to its own maximum time-slice, but no larger. An owner thread can restrict a child thread's time-slice to a value smaller than its own maximum, too. This enables a high level of determinism and predictability in the system's operation.

Figure 3B:
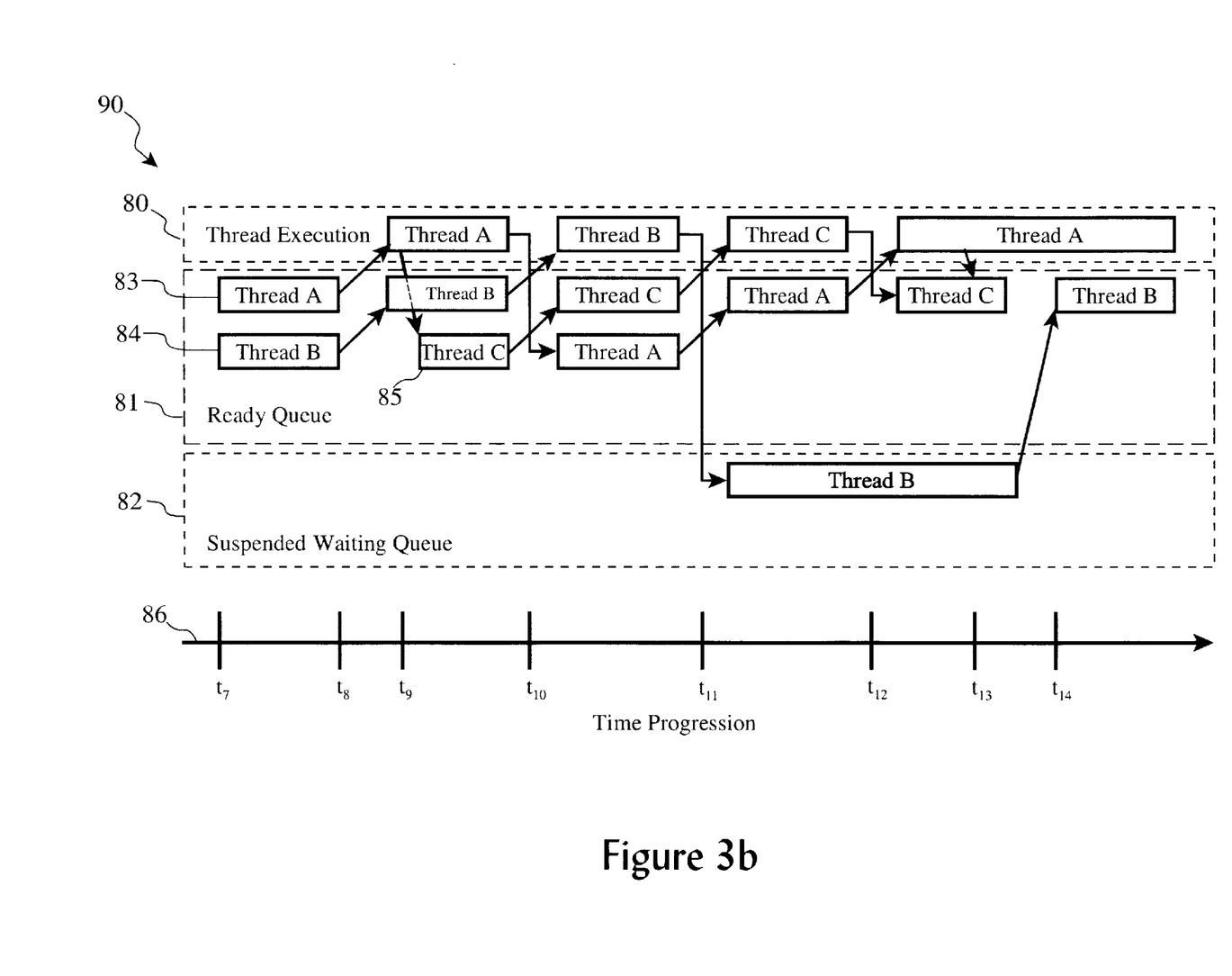

Turning to FIG. 3b, the same threads A (83), thread B (84) and thread C (85) are illustrated from the example of FIG. 3a, as well as the same Ready queue (81), timeline (86), and processor (80), of the system (90). However, in this case, at time=$t_7$, only threads A (83) and B (84) exist. After time=$t_8$, while thread A is executing on the processor (80), thread A creates a child thread C (85), which is placed on the bottom of the Ready queue (81) by the OS (90) at time=$t_9$. At time=$t_{10}$, thread A exceeds its maximum time-slice, is placed on the bottom of the Ready queue, thread B is allowed to execute on the processor, and child thread C (85) is advanced to the next pending position in the Ready queue by the operating system. Shown at time=$t_{12}$, thread B (84) suspends itself to wait for an event (82), and the OS system (90) allows thread C (85) to execute on the processor (80), making thread A (83) the next pending thread in the Ready queue. Finally, shown in FIG. 3b, is a situation where thread C has yielded the processor to thread A and returned to the Ready queue, and thread A destroys thread C at time=$t_{13}$ using its ownership or parental privileges to do so. Subsequently, there are no pending threads in the Ready queue (81), so at time=$t_{14}$, when the proper event is received, thread B is placed on the top of the Ready queue (82).

A further feature of the present invention is the dynamic system resource reclamation. This function of the System Resource Management Group detects abandoned system resources, such as memory and peripherals, which were originally allocated to a thread, and returns them to the available pool upon termination of the owner thread. Normal thread termination, through an explicit release request or a return sequence, will be detected and caught. If a last callback, or exit routine, is associated with the thread, it will be called. All thread interface resources allocated to a terminating thread will then be reclaimed for reuse. The thread interface will also ensure reclamation of all system resources not local to the thread interface. In the preferred embodiment, heap memory, DMA packets, crossbars and semaphores allocated by the terminating thread are reclaimed. Device locks owned by the terminating thread are released. The processing system's resource reclamation process consumes processor execution bandwidth only at thread terminus. This eliminates the consumption of processor cycles incurred by prior art operating system designs, which execute resource reclamation processes periodically regardless of whether a thread or threads have terminated.

Figure 4A:
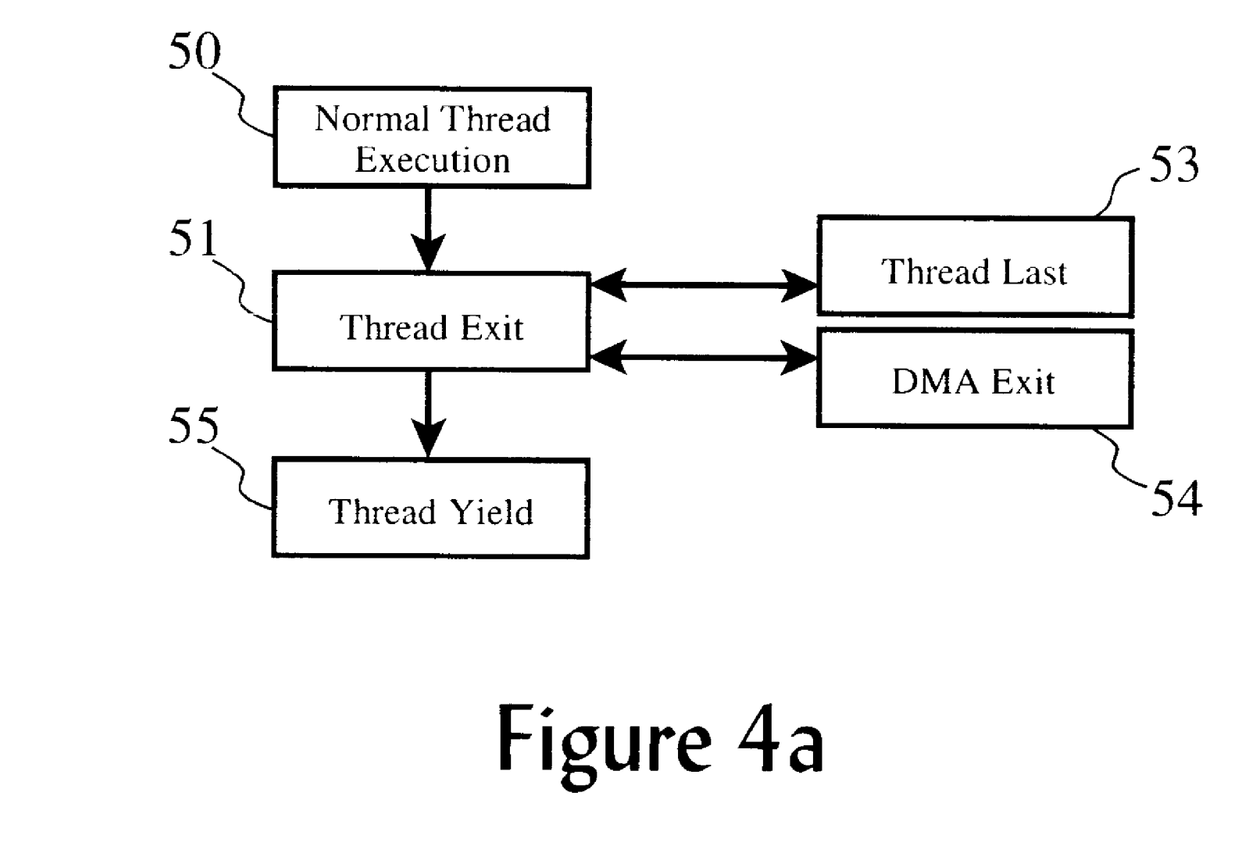
FIG. 4 shows the system's unique and efficient process to reclaim system resources from terminated application threads.

FIG. 4a illustrates the resource reclamation method used by the processing system. Upon conclusion of normal thread execution (50), an exit routine (51) is executed, which in turn executes a routine to determine if this is the last or top parent routine If it is the top parent routine, a release of associated DMA resources (54) is performed, and finally the thread yields (55) execution to the next awaiting thread in the FIFO queue. This causes the resource reclamation function to reclaim the resources associated with the terminating top parent thread.

Figure 4B:
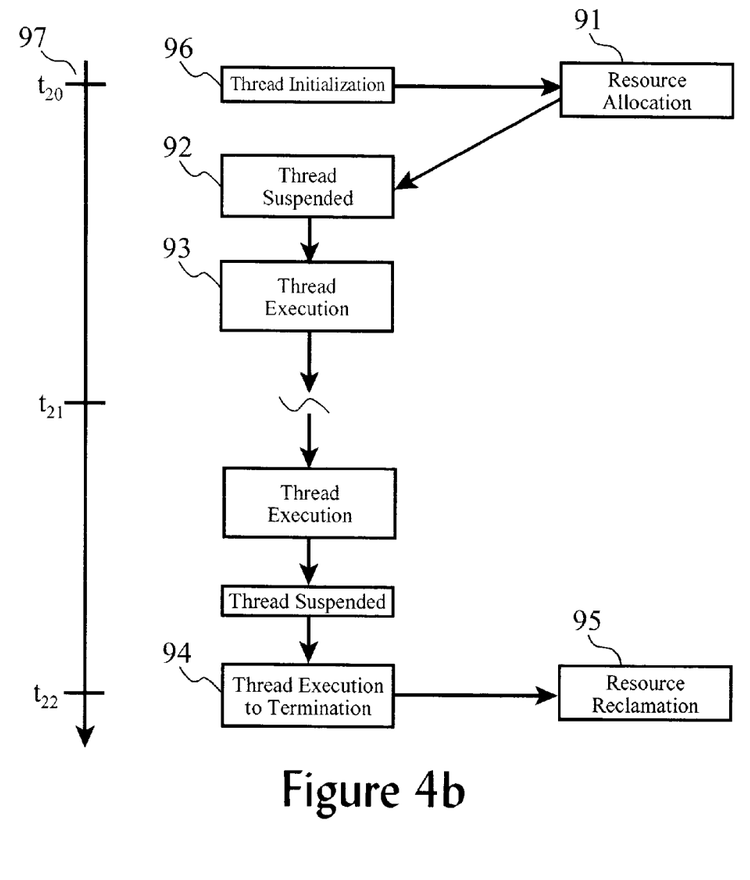

FIG. 4b shows a timeline of the life of a thread related to resource allocation and reclamation. In FIG. 4b, time progresses from the top of the drawing to the bottom of the drawing, as shown by the time bar (97). At time=$t_{20}$, a thread (96) is initialized. Upon initialization, the thread (96) requests allocation of system resources such as memory spaces, page locks to crossbar communications (discussed infra), synchronization elements such as semaphores, and the like. Upon this request, the system's resource allocation (91) function is invoked, wherein available resources are allocated or locked to the requesting thread (96) for the duration of the life of the thread (96). The thread then executes, passing through periods of execution (93) and suspension (92), shown by the continuation of time at time=$t_{21}$ on the time bar (97). Upon conclusion of the processing necessary by the thread, the thread requests termination (94), shown at time=$t_{22}$ on the time bar (97), which invokes the system's automatic resource reclamation (95). The resource reclamation function (95) releases all of the system resources which had been allocated or locked to the thread, and places them back into a pool of available resources for other threads to request.

Yet another feature of the present invention, which enables highly efficient use of the digital signal processing system, is an integral inter-process and process-to-hardware communication mechanism called a crossbar channel. Crossbar channels are synchronous switched data channels with configurable input and output mappings. No restrictions exist on types of entities interacting with crossbars. Crossbars may be used to communicate between two processes, to broadcast from one process to many other processes, or to communicate between a process and a system resource such as a hardware peripheral.

Crossbar channel "subscribers" may be categorized in one of two fields: data producer or data consumer. Production and consumption may coexist in threads or interrupt service routines. Allocation, transmission and reception may be selectively synchronized.

Data producers may allocate available page references and send previously allocated or received pages. Data consumers may receive page references. Allocated and received pages are locked until explicitly sent or released and made available for reuse by a crossbar.

Crossbar channel connections may be configured or mapped dynamically to support a number of data flow paradigms, including variations and combinations of multicast, first-come first-serve, producer-consumer, cube and ring. Mappings may be used to provide abstraction to consumers or producers regarding source or destination ports of interest.

Figure 5:
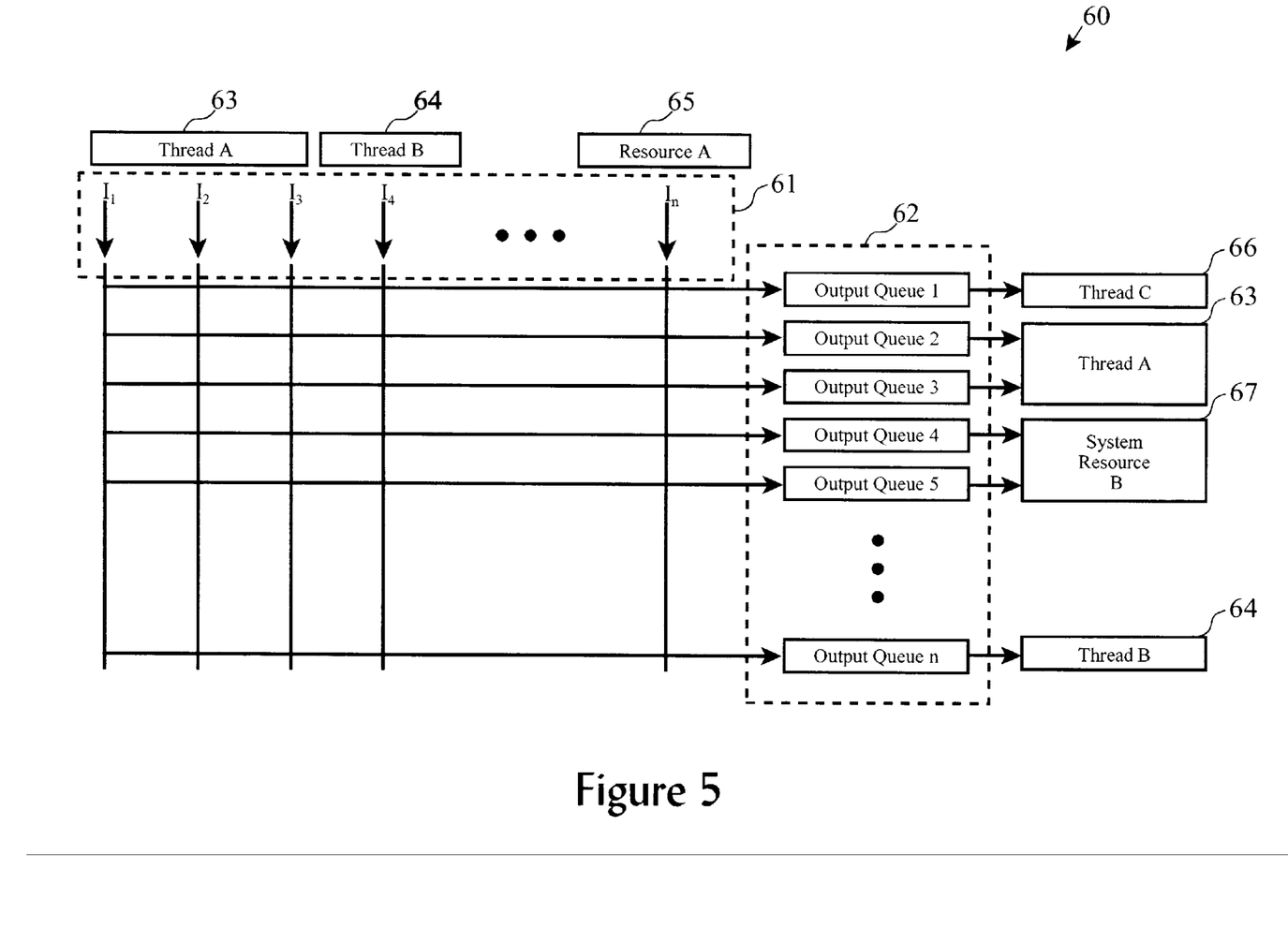
FIG. 5 shows a two-dimensional representation of the crossbar communication mechanism of the system which allows producer and consumer thread independence as described in the Objects of the Invention.

FIG. 5 illustrates the nature of a single crossbar, with multiple producers and consumers. The crossbar channel mapping (60) defines how data from a plurality of crossbar input channels (61) is routed to a plurality of crossbar output channels and queues (62). This crossbar mapping (60) is dynamically changeable by the threads which have had the related input channels assigned to them by the system. In FIG. 5, two threads, thread A (63) and thread B (64), and a system resource A (65) are shown as channel input owners. Thread A (63) owns three channel inputs, $I_1$, $I_2$, and $I_3$; thread B (64) owns a single channel input $I_4$; and system resource A (65) owns the last channel input, $I_n$. Data submitted to the crossbar is queued for output to threads and system resources, which have had channel outputs (62) allocated to them. A thread or system resource can produce data only, consume data only, or both. FIG. 5 shows thread A (63) is a producer on three channels as described supra, as well as a consumer on channels 2 and 3. Thread C (66) is shown as a consumer of data only, on channel 1, as well as system resource B (67) on channels 4 and 5.

The inventive system supports multiple crossbar channels, each operating independently of the others. The system allows mappings to be implemented that include threads, resources, and other crossbars as producers and consumers. This enables advanced multi-dimensional communications schemes to be easily realized by the application code and system designer, without a loss of efficiency or an increase in processing overhead.

The preceding disclosure of the present invention including the described particular implementation ways of meeting its objectives has included the conceptual operation of the processing system and details of the preferred embodiment. However, it will be appreciated by those skilled in the relevant arts that many alternative implementations may yield a system that does not depart from the scope and spirit of the claims. It will be further appreciated by those skilled in the art, that the objectives and advantages of the disclosed invention are equally fulfilled by the invention in fields of general processing and digital signal processing.

We claim:

1. The method of allowing a plurality of processing threads to be executed by one or more processing units, wherein the steps comprise:

(a) assigning each of said processing threads one of four state values, said state values being selected from "Currently Executing", "Ready", "Suspended", and "Suspended-waiting";

(b) placing all threads which have been assigned a state value of "Ready" into a "Ready Queue", said "Ready Queue" having an input and an output, said "Ready" threads being placed into the "Ready Queue" input in the order which threads are assigned a "Ready" state value first in time;

(c) placing all threads which have been assigned a state value of "Suspended" into a "Suspended Queue", said "Suspended Queue" having an input and an output, said "Suspended" threads being placed into the "Suspended Queue" input in the order which threads are assigned the "Suspended" state value first in time;

(d) placing all threads which have been assigned a state value of "Suspended-waiting" into a "Suspended-waiting Queue", said "Suspended-waiting Queue" having an input and an output, said "Suspended-waiting" threads being placed into the "Suspended-waiting Queue" input in the order which threads are assigned the "Suspended-waiting" state value first in time;

(e) executing one or more threads which are assigned the state value of "Currently Executing" on said processing units until said threads under execution are changed to one of said state values of "Ready", "Suspended", and "Suspended-waiting";

(f) changing the state of the oldest waiting thread in the "Ready Queue" to "Currently Executing" and executing this thread on said processing units, thereby allowing threads queued in the "Ready Queue" to be executed in a first-in first-out manner;

(g) assigning a state value of "Ready" to a thread in the "Suspended" queue and placing that thread into the "Ready Queue" input upon explicit request by a currently-executing thread; and (h) assigning a state value of "Ready" to a thread in the "Suspended-waiting Queue", and placing that thread into the "Ready Queue" input upon occurrence of a pre-defined trigger event.

2. The method of allowing a plurality of processing threads to be executed by one or more processing units as set forth in claim 1, wherein said processing units are adapted for receiving and registering hardware interrupt signals, and said predefined trigger event to cause changing of a "Suspended-waiting" thread to a state value of "Ready" includes the occurrence of a hardware interrupt on said processing units.

3. The method of allowing a plurality of processing threads to be executed by one or more processing units as set forth in claim 1, wherein said processing units are adapted for monitoring and tracking time through one or more timer units, and said predefined trigger event to cause changing of a "Suspended-waiting" thread to a state value of "Ready" includes the occurrence of a specific timer unit value.

4. The method of allowing a plurality of processing threads to be executed by one or more processing units as set forth in claim 1, wherein said processing units are adapted for storing and manipulating software semaphores, and said predefined trigger event to cause changing of a "Suspended-waiting" thread to a state value of "Ready" includes the occurrence of a specific value of a software semaphore.

5. The method of allowing a plurality of processing threads to be executed by one or more processing units as set forth in claim 1, wherein said processing units are adapted for storing and manipulating software lock, and said predefined trigger event to cause changing of a "Suspended-waiting" thread to a state value of "Ready" includes the occurrence of a specific value of a software lock.

* * * * *